United States Patent
Wu et al.

(10) Patent No.: US 8,415,971 B2
(45) Date of Patent: Apr. 9, 2013

(54) TRANSCEIVING CIRCUIT AND TRANSCEIVING CIRCUIT RESISTANCE CALIBRATION METHOD

(75) Inventors: Chien-Ming Wu, Taoyuan County (TW); Su-Liang Liao, Hsinchu County (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 0 days.

(21) Appl. No.: 13/397,660

(22) Filed: Feb. 15, 2012

(65) Prior Publication Data
US 2012/0223736 A1  Sep. 6, 2012

(30) Foreign Application Priority Data
Mar. 3, 2011 (TW) .............................. 100107090 A (51) Int. Cl.
*H03K 17/16* (2006.01)
(52) U.S. Cl. .............................. 326/30; 326/26; 326/82
(58) Field of Classification Search .................. 326/26, 326/27, 30, 82, 83
See application file for complete search history.

(56) References Cited

U.S. PATENT DOCUMENTS

| | | | |
|---|---|---|---|
| 6,734,702 B1 | 5/2004 | Ikeoku | |
| 7,119,661 B2 * | 10/2006 | Desai et al. | 340/5.61 |
| 7,791,367 B1 * | 9/2010 | Pelley | 326/30 |
| 2010/0066405 A1 * | 3/2010 | Chang et al. | 326/30 |
| 2010/0105100 A1 * | 4/2010 | Sakurada et al. | 435/29 |
| 2010/0225349 A1 * | 9/2010 | Santurkar et al. | 326/30 |
| 2010/0237903 A1 * | 9/2010 | Nguyen | 326/30 |

* cited by examiner

*Primary Examiner* — Don Le
(74) *Attorney, Agent, or Firm* — Winston Hsu; Scott Margo (57) ABSTRACT

A transceiving circuit resistance calibrating method, which is applied to a transceiving circuit. The method includes: inputting a first current to a transmitter to generate a first output voltage, wherein the first current is generated according to a ratio between a predetermined voltage and an inner resistor of a chip; inputting a second current to a transmitter to generate a second output voltage, wherein the first current is generated according to a ratio between the predetermined voltage and a predetermined resistor; and adjusting a first adjustable resistance module according to a difference between the first output voltage and the second output voltage.

17 Claims, 7 Drawing Sheets

TRANSCEIVING CIRCUIT AND TRANSCEIVING CIRCUIT RESISTANCE CALIBRATION METHOD

BACKGROUND OF THE INVENTION

1. Field of the Invention

The present invention relates to a transceiving circuit and a related transceiving circuit resistance calibration method, and particularly relates to a transceiving circuit and a related transceiving circuit resistance calibration method, which utilizes devices thereof for resistance matching.

2. Description of the Prior Art

For a communication system, resistance matching for a transmission path must be seriously concerned. Since drift occurs for the resistor inside the chip, a circuit that can calibrate resistance matching is needed for accurate resistance matching. One of the solutions is providing a high accurate calibrating circuit to reach the purpose of calibration resistance. However, the calibrating circuit must occupies a great region, if it is desired to perform accurate calibration. For example, the USA patent with a number U.S. Pat. No. 6,734,302 discloses such calibrating mechanism.

SUMMARY OF THE INVENTION

Therefore, one objective of the present invention is to provide a transceiving circuit and a related transceiving circuit resistance calibration method such that the resistance in the transceiving circuit can be calibrated via the device in the transceiving circuit, thereby the large calibration circuit area issue can be improved.

One embodiment of the present invention discloses a transceiving circuit resistance calibration method, applied to a transceiving circuit. The method comprises: inputting a first current to the transmitter to generate a first output voltage, wherein the first current is generated according to a ratio between a predetermined voltage and an inner resistor of a chip; inputting a second current to the transmitter to generate a second output voltage, wherein the second current is generated according to a ratio between the predetermined voltage and a predetermined resistor; and adjusting the first variable resistance module according to the first output voltage and the second output voltage.

Another embodiment of the present invention discloses a transceiving circuit, comprising: a transmitter; a receiver; a first variable resistance module; and a control unit, for controlling a first current to be transmitted to the transmitter to generate a first output voltage, wherein the first current is generated according to a ratio between a predetermined voltage and an inner resistor of a chip, the control unit, wherein the control unit also controls a second current to be transmitted to the transmitter to generate a second output voltage, wherein the second current is generated according to a ratio between the predetermined voltage and a predetermined resistor, where the control unit further adjusts the first variable resistance module according a difference between the first output voltage and the second output voltage.

Still another embodiment of the present invention discloses a transceiving circuit resistance calibration method, applied to a transceiving circuit. The method comprises: inputting a first current to the transmitter to generate a first output voltage, wherein the first current is generated according to a ratio between a predetermined voltage and an inner resistor of a chip; inputting a second current to the transmitter to generate a second output voltage, wherein the second current corresponds to the first current; and adjusting the variable resistance module according to the first output voltage and the second output voltage.

Still another embodiment of the present invention discloses a transceiving circuit, comprising: a transmitter; a receiver, wherein the transmitter and the receiver are provided in a single chip; a variable resistance module; and a control unit, for controlling a first current transmitted to the transmitter to generate a first output voltage, wherein the first current is generated according to a ratio between a predetermined voltage and an inner resistor of the chip, where the control unit controls a second current transmitted to the transmitter to generate a second output voltage, wherein the second current corresponds to the first current; where the control unit further adjusts the variable resistance module according to a difference between the first output voltage and the second output voltage.

In view of above-mentioned embodiment, the inner resistance of a transceiving circuit can be utilized to match desired resistance matching, thus the circuit area that is needed for prior art resistance matching mechanism can be saved.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
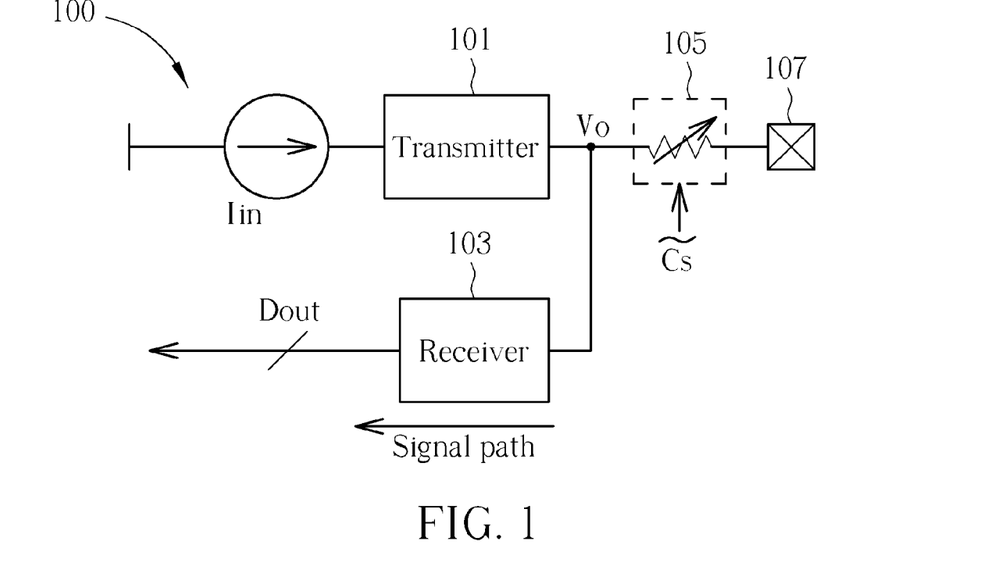
FIG. 1 is a block diagram illustrating a transceiving circuit according to an embodiment of the present invention.

FIG. 1 is a block diagram illustrating a transceiving circuit 100 according to an embodiment of the present invention. As shown in FIG. 1, the transceiving circuit 100 comprises a transmitter 101, a receiver 103, a variable resistance module 105. The transmitter 101 and the receiver 103 are provided in a single chip. The chip can transmit a signal via the transmitter 101 and the pad 107, and receive a signal via the receiver 103 and the pad 107.

Figure 2:
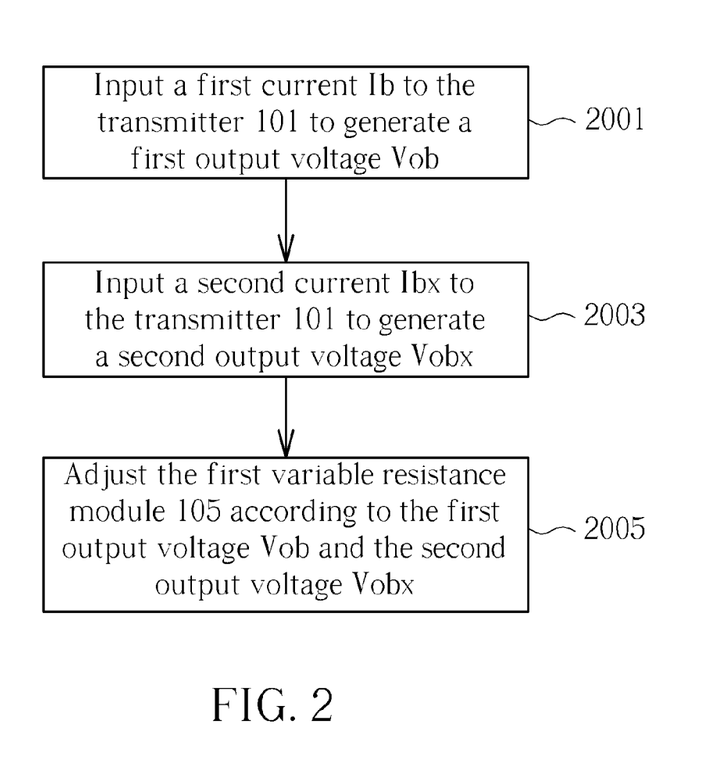
FIG. 2 is a flow chart illustrating a transceiving circuit resistance calibration method corresponding to the embodiment shown in FIG. 1.

The transceiving circuit resistance calibration mechanism can be shown as FIG. 2, which includes:

Step 2001

Input a first current $I_b$ to the transmitter 101 to generate a first output voltage $V_{ob}$ at $V_o$. The first current Ib is generated according to a ratio between a predetermined voltage and an inner resistor of a chip. In one embodiment, $$I_b = K_1 \times \frac{Vbg}{Rpoly}.$$

$V_{bg}$ is a predetermined voltage that does not change due to temperature variation and process drift. $R_{poly}$ is an inner resistor of a chip, on which the transmitter 101 and the receiver 103 are provided. Also, $K_1$, which can be 1, is a parameter for adjusting $I_b$.

The inner resistor of the chip can be formed in many types. Popular ones are poly resistor and diffusion resistor. The poly resistor can be formed by the poly material in the chip, such as poly silicon. The diffusion resistor is formed by the region processed by a diffusion process in the chip. Please note the poly resistor is utilized as an example to explain the embodiments of the present invention, but does not mean to limit the scope of the present invention. The concept disclosed in the present invention can also be utilized in other types of inner resistors.

Step 2003

Input a second current $I_{bx}$ to the transmitter 101 to generate a second output voltage $V_{obx}$ at $V_o$. The second current $I_{bx}$ is generated according to a ratio between the predetermined voltage and a predetermined resistor $R_{ext}$. In one embodiment, $$I_{bx} = K_2 \times \frac{Vbg}{Rext},$$

wherein $R_{ext}$ is a resistance value for a predetermined resistor (or called an accurate resistor of the chip). The parameters $K_1$ and $K_2$ are utilized to adjust the ratio difference of $I_b$ and $I_{bx}$. For example, $R_{poly}$ and $R_{ext}$ can be different orders (ex. $10^2$ and $10^4$), thus $I_b$ and $I_{bx}$ can be adjusted via $K_1$ and $K_2$.

Step 2005

Adjust the first variable resistance module 105 according to the first output voltage $V_{ob}$ and the second output voltage $V_{obx}$. In one embodiment, values for the first output voltage $V_{ob}$ and the second output voltage $V_{obx}$ are transmitted to an analog to digital converter (ADC, not illustrated) of the receiver 103, to compute $D_a$ and $D_{ax}$. Then, the drift of the inner resistor $R_{poly}$ in the chip can be computed according to the difference between $D_a$ and $D_{ax}$. The drift value of the variable resistance module 105 is the same as which of the inner resistor $R_{poly}$, since the inner resistor $R_{poly}$ is a poly resistor and the material of the variable resistance module 105 is the same as which of the variable resistance module 105.

Accordingly, a control signal such as a control code word can be utilized to adjust the resistance value of the variable resistance module 105 to be the desired one. For example, if the inner resistor $R_{poly}$ drifts for 10%, the variable resistance module 105 will also be adjusted for 10% to compensate it.

In one embodiment, steps 2001-2005 can be performed by a control unit or a control code.

Figure 3:
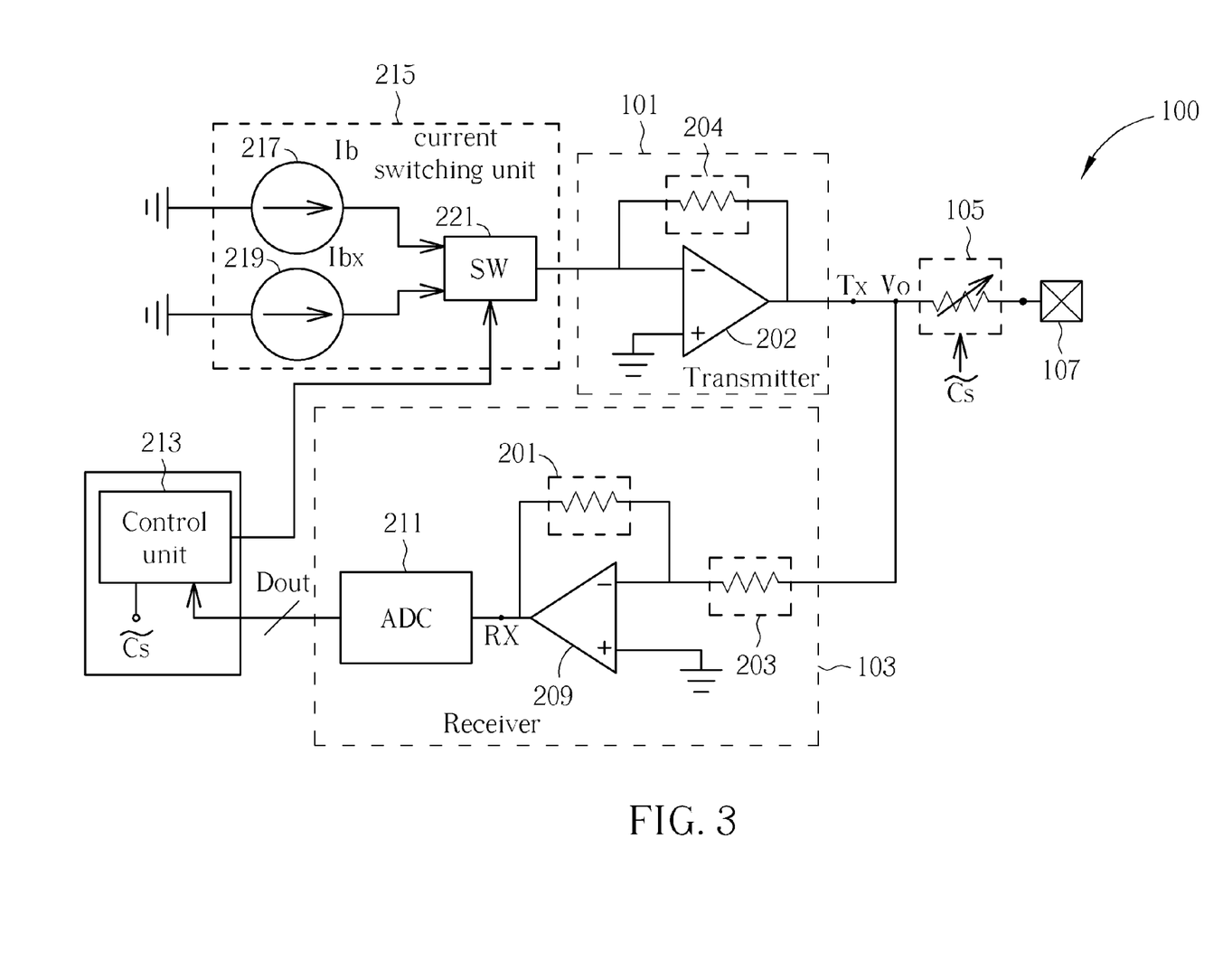
FIG. 3 is one example for a detail structure for the transceiving circuit shown in FIG. 1.

FIG. 3 is one example for a detail structure for the transceiving circuit 100 shown in FIG. 1. Please note that a small signal model is utilized to explain the transceiving circuit 100 in the embodiment of FIG. 3. It should be noted that the circuit structure and the operation thereof is only for example and do not mean to limit the present invention. As shown in FIG. 3, the transmitter 101 includes an amplifier 202. Additionally, the resistor 204 equals to the inner resistor $R_{poly}$ in the chip. The receiver 103 includes resistors 201, 203, an amplifier 209 and an ADC 211. In this embodiment, the current $I_b$ makes a voltage value at the output terminal $T_x$ of the transmitter 101 equals to above-mentioned $V_{ob}$, and makes a voltage value at the output terminal Rx of the amplifier 209 equals to $-V_{bg}$. After that, the current $I_{bx}$ is transmitted to the transmitted 101, such that the voltage at the terminal $T_x$ of the transmitter 101 equals to $V_{obx}$, and makes a voltage value at the output terminal Rx of the amplifier 209 equals to $-V_{obx}$. Next, as above-mentioned, $-V_{bg}$ and $-V_{obx}$ are transmitted to the ADC 211 for computing related $D_{out}$. Thereby the drift of the inner resistor $R_{poly}$ can be computed to control the signal CS to adjust the variable resistance module 105. Please note, input resistance of the receiver is significantly higher than which of the high variable resistance module 105. Therefore the voltages at two terminals of the variable resistance module 105 are substantially the same. Accordingly, Vo can put at either the right terminal of the variable resistance module 105 nor the left terminal of the variable resistance module 105 without affecting following equations about Vo. In this embodiment, a current switching unit 221 can be included, which receives the control signal of the control unit 213 to switch between two current sources 217 ($I_b$) and 219 ($I_{bx}$). The control unit 213 receives $D_{out}$ from the ADC 211 to perform the switching operation for current sources, which means switching the current switching unit 215, to output the control signal CS to adjust the variable resistance module 105 according to $D_{out}$.

Figure 4:
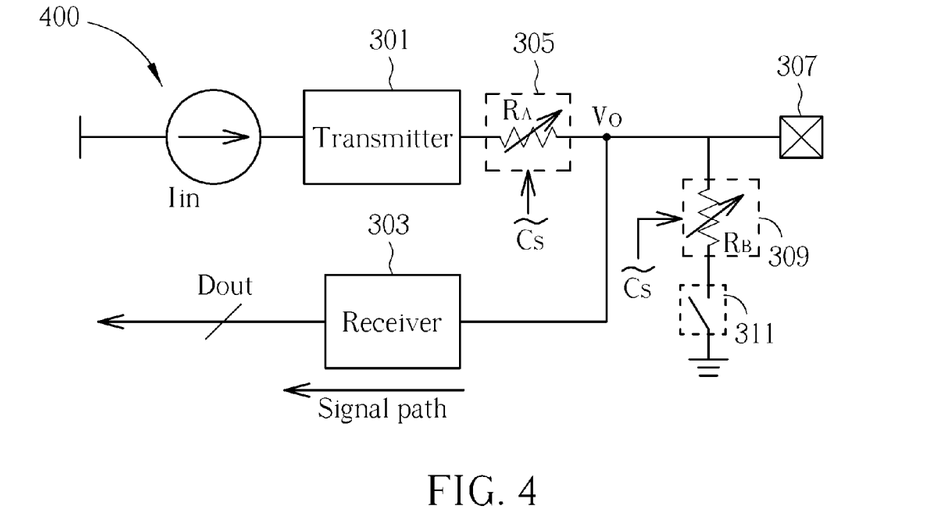
FIG. 4 is a block diagram illustrating a transceiving circuit according to another embodiment of the present invention.

FIG. 4 is a block diagram illustrating a transceiving circuit 400 according to another embodiment of the present invention. Comparing with the transceiving circuit 100 shown in FIG. 1, the transceiving circuit 400 further includes another variable resistance module 309 (in the embodiment, a variable resistor) and a switch device 311, besides the transmitter 301, the receiver 303 and the variable resistance module 305. The transmitter 301 can be turned off if it does not operate, and the switch 311 can be conductive such that a conductive path can be generated between the variable resistance module 309 and the receiver 303. By this way, desired resistance matching can be provided by the variable resistance module 309. Thereby, the power for maintaining the transmitter 301 can be saved. However, the variable resistance module 309 may also have resistance drift due to different device processes, this a calibration mechanism is for which is also needed.

In this embodiment, the variable resistance module 309 is adjusted after the variable resistance module 305 is adjusted via above-mentioned mechanism. The adjusting mechanism for the variable resistance module 309 can be shown as FIG. 10, which includes:

Step 1001

Figure 10:
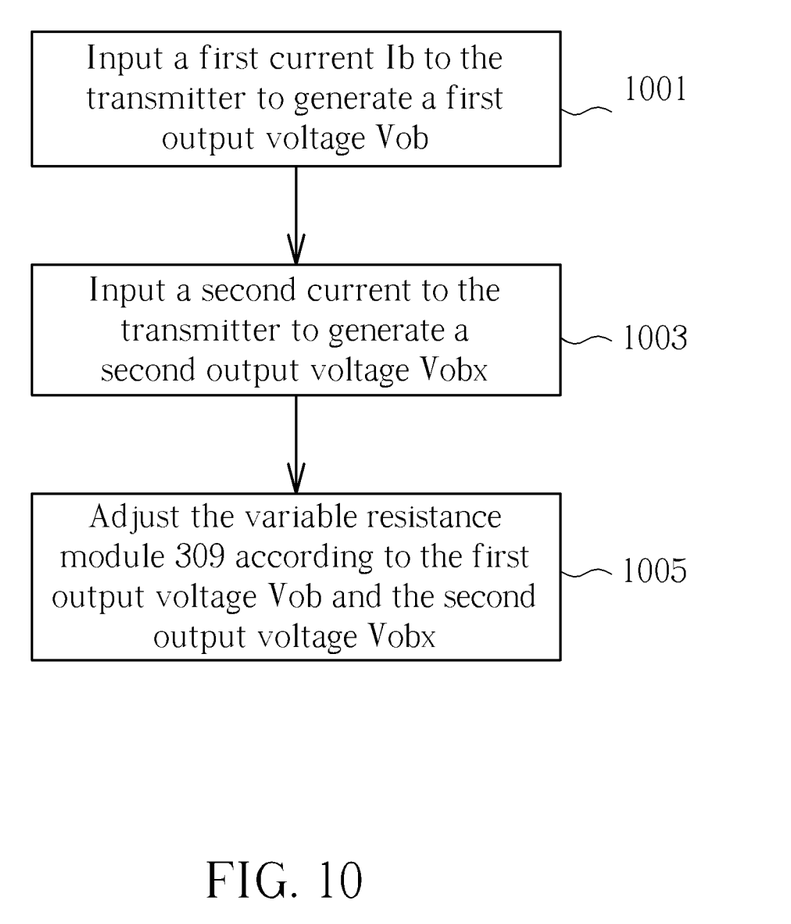
FIG. 10 is a flow chart illustrating a transceiving circuit resistance calibration method corresponding to the embodiment shown in FIG. 9.

Input a first current $I_b$ to the transmitter to generate a first output voltage $V_{ob}$. The first current $I_b$ is generated according to a ratio between a predetermined voltage and an inner resistor of a chip. In one embodiment, $$I_b = K_1 \times \frac{Vbg}{Rpoly}.$$

$V_{bg}$ is a predetermined voltage. $R_{poly}$ is an inner resistor of a chip, on which the transmitter 101 and the receiver 103 are provided. Also, $K_1$, which can be 1, is a parameter for adjusting $I_b$.

Step 1003

Input a second current to the transmitter to generate a second output voltage $V_{obx}$. In one embodiment, the second current equals to 50% $I_{b+50}$% $Ib_x$, which are shown in FIG. 2.

Step 1005

Adjust the variable resistance module 309 according to the first output voltage $V_{ob}$ and the second output voltage $V_{obx}$. In one embodiment, values of the first output voltage $V_{ob}$ and the second output voltage $V_{obx}$ are transmitted to the ADC in the receiver 303 to compute $D_b$ and $D_{bx}$. Then, a difference between the inner resistor $R_{poly}$ and the predetermined resistor can be computed according to $D_b$ and $D_{bx}$, and the variable resistance module 309 is adjusted by a control signal (ex. control code word).

Figure 5:
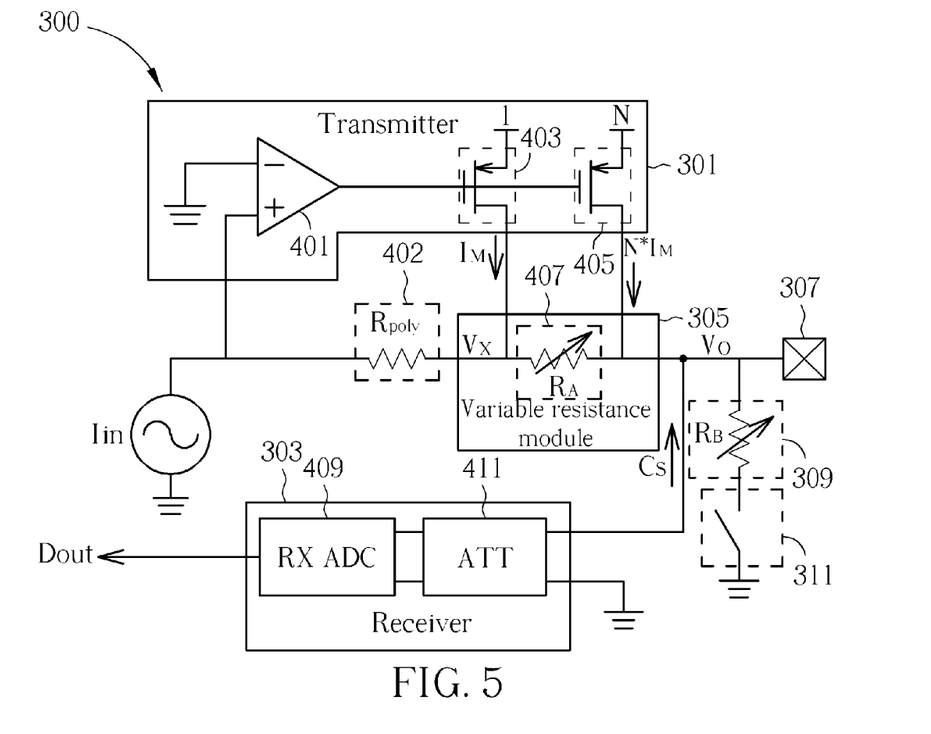
FIG. 5 is one example for a detail structure for the transceiving circuit shown in FIG. 4.

The reason for why a resistance value drift of the variable resistance module 309 can be acquired according to the output voltages $V_{ob}$ and $V_{obx}$ will be detailedly depicted in FIG. 5. The variable resistance module 309 can be accordingly adjusted after the resistance value drift of the variable resistance module 309 is acquired.

FIG. 5 is one example for a detail structure for the transceiving circuit shown in FIG. 4. In the circuit shown in FIG. 5, the operation of the transceiving circuit 300 is shown in a small signal form. It should be noted that the circuit and operation shown in FIG. 5 is only for example and does not mean to limit the scope of the present invention. In this embodiment, the transmitter 301 includes an amplifier 401, a transistor 403 (a PMOSFET in this embodiment) and a transistor 405. The resistor 402 simulates the inner resistor $R_{poly}$ in the chip. The variable resistance module 305 includes a variable resistor 407. In this embodiment, the control signal CS is input to the variable resistor 407. The receiver 303 includes an ADC 409 and a signal attenuator 411.

In this embodiment, the resistor 402 ($R_{poly}$) has an order of K The resistor $R_A$ is also a resistor having an order of K based upon the following equation (2). The resistor 309 is for resistance matching when the transmitter turns off. The resistor 309 is for resistance matching when the transmitter turns off, therefore the resistor 309 ($R_B$) and the resistor 407 are different types of resistors. Such that a calibration step for resistor 309 is needed. The purpose for calibrating the resistor 309 is to calibrate it to be the same as the external transmission line resistor $R_L$ (in Ethernet field, $R_L$ is always to be 50 ohm). In order to detect the drift of the resistor 309 according to the output voltage [$R_{B(real)}=R_{B(design)}*(1+y)$], some conditions as follows much be matched in one embodiment:

(1) $I_{in}$ equals to 50% $I_b$ plus 50% $I_{bx}$. If $I_b$ is set to be equal to $I_{bx}$, an equation $I_{in}=K*V_{bg}*[1+1/(1+x)]$ can be acquired, wherein $$K = \frac{K_1}{R_{poly(design)}} = \frac{K_2}{R_{ext}}$$

(x is the inner resistor drift amount).

The derivation can be shown as follows:

$$Ib = K_1 \times \frac{Vbg}{Rpoly} = K_1 \times \frac{Vbg}{Rpoly(\text{design}) \times (1+x)}$$

$$I_{bx} = K_2 \times \frac{Vbg}{Rext}.$$

If $$K_1 \times \frac{Vbg}{Rpoly} = K_2 \times \frac{Vbg}{Rext}$$

is set to be K, $I_{in}=K*V_{bg}*[1+1/(1+x)]$ can be acquired.

(2) $R_A=R_L*(1+N)$, output resistance-transmission line resistance ($R_L$).

(3) $R_A$ must be calibrated first. The calibration method is shown as above-mentioned.

(4) $R_{poly}$ must be "suitably selected". For example, $R_{poly}=R_L*N$.

The following description depicts why the output voltage $V_o$ ($V_{ob}$, and $V_{obx}$ shown in FIG. 9) includes information about $R_B$ drift value "y", when $R_B$ is calibrated after the calibration of $R_A$. Also, why can above-mentioned method adjust $R_A$ in this embodiment will also be illustrated in FIG. 6.

$$V_X = I_{in} \times R_{poly}$$

$$I_{in} + \frac{V_X - V_O}{R_A} = I_M$$

$$\frac{V_O - V_X}{R_A} + \frac{V_O}{R_B} = N \times I_M$$

N is a ratio between the currents that provided by transistors 403 and 405.

$$\frac{V_O - V_X}{R_A} + \frac{V_O}{R_B} = N \times \left[I_{in} + \frac{V_X - V_O}{R_A}\right] \Rightarrow V_o \times \left[\frac{1+N}{R_A} + \frac{1}{R_B}\right] =$$

$$I_{in} \times R_{poly} \times \left[\frac{1+N}{R_A} + \frac{N}{R_{poly}}\right] \Rightarrow \frac{Vo}{Iin} = \frac{\frac{R_{poly} \times (1+N)}{R_A} + N}{\frac{1+N}{R_A} + \frac{1}{R_B}}$$

Therefore, it can be understood that the relations between $I_{in}$ and $V_o$ can be presented by $R_A$, $R_B$ and $R_{poly}$.

If above-mentioned $V_{in}$ and $V_{out}$ are replaced with $$I_{in} = K \times V_{bg} \times \left[1 + \frac{1}{1+x}\right]$$

and $R_{poly}=R_L \times N \times (1+x)$, following equations can be acquired. $R_L$ is the transmission resistance looked outward from 307. Ideally $R_{poly}$ should be the same as $R_L$, but practically has x drift. Also, since a current of the transistor 405 is N times as which of the transistor 403, the equation $R_{poly}=R_L \times N \times (1+x)$ can be acquired based on circuit theory. Besides, it will be depicted later why $R_A=R_L*(1+N)$.

$$V_o = I_{in} \times \frac{\frac{R_{poly(real)} \times (1+N)}{R_A} + N}{\frac{1+N}{R_A} + \frac{1}{R_{B(real)}}} =$$

$$K \times V_{bg} \times \left[1 + \frac{1}{1+x}\right] \times \frac{\frac{R_L \times N \times (1+x) \times (1+N)}{R_L \times (1+N)} + N}{\frac{1+N}{R_L \times (1+N)} + \frac{1}{R_{B(design)}(1+y)}} =$$

$$K \times V_{bg} \times \left[1 + \frac{1}{1+x}\right] \times \frac{N \times [1+(1+x)]}{\frac{1}{R_L} + \frac{1}{R_{B(design)}(1+y)}} =$$

$$K \times V_{bg} \times N \times R_L \times \left[1 + \frac{1}{1+x} + (1+x) + 1\right] \times \frac{1}{1 + \frac{1}{(1+y)}}$$

If x is far less than 1, $$\frac{1}{1+x} = 1 - x$$

The following equation can be obtained $$= K \times V_{bg} \times N \times R_L \times [1 + (1-x) + (1+x) + 1] \times \frac{1}{1 + \frac{1}{(1+y)}} =$$

$$K \times V_{bg} \times N \times R_L \times 4 \times \frac{1}{1 + \frac{1}{(1+y)}} = \text{constant} \times \frac{1}{1 + \frac{1}{(1+y)}}$$

Accordingly, it can be understood that the output voltage Vo includes the information for $R_B$ drift value "y".

The following description will depict why $R_A=R_L*(1+N)$

Please refer to FIG. 5 again, if $I_{in}$ is coupled to ground, $V_x$ is 0, and an $I_{out}$ flows into 307, the following equation can be acquired:

$$V_X = 0$$

$$\frac{V_X}{R_{poly}} + \frac{Vx - Vo}{R_A} = I_M$$

$$\frac{V_O - V_X}{R_A} = N \times I_M + I_{out}$$

$$\frac{V_O}{R_A} = N \times \left[\frac{-V_O}{R_A}\right] + I_{out} \Rightarrow V_O \times \frac{1+N}{R_A} = I_{out} \Rightarrow \frac{V_O}{I_{out}} = \frac{R_A}{1+N}$$

The output resistance is $R_L$, thus $$\frac{V_O}{I_{out}} = R_L \Rightarrow R_A = R_L \times (1+N).$$

Figure 6:
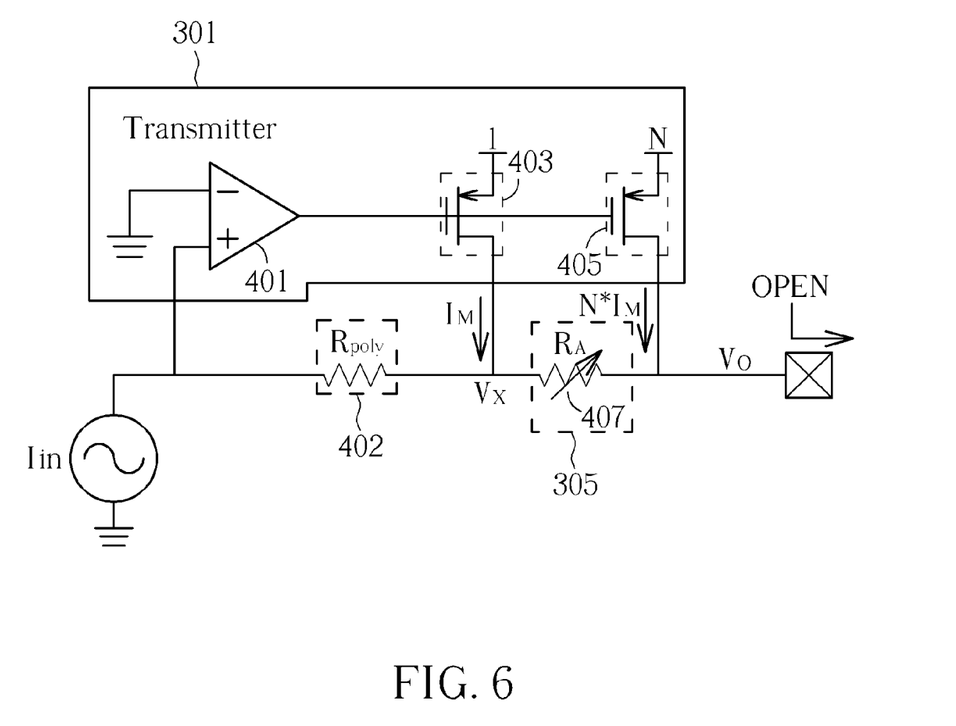
FIG. 6 depicts a situation that the transceiving circuit in FIG. 5 is open.

FIG. 6 depicts a situation that the transceiving circuit in FIG. 5 is open, which depicts why the output voltage includes information of $R_A$ drift amount x if the currents $I_b$ and $I_{bx}$ are respectively input, when the circuit shown in FIG. 5 only calibrates $R_A$.

The output voltage in FIG. 6 can be shown as follows:

$$\begin{cases} V_x = I_{in} \times R_{poly} \\ I_M + N \times I_M = I_{in} \\ V_{out} = V_x + N \times I_M \times R_A \end{cases}$$

$$V_{out} = I_{in} \times R_{poly} + N \times \frac{I_{in}}{N+1} \times R_A = I_{in} \times \left(R_{poly} + \frac{N}{N+1} \times R_A\right)$$

$R_{poly}$ and $R_A$ are the same types of resistors, thus have the same drift x for a process.

$$V_{out} = I_{in} \times \left[R_{poly(design)} \times (1+x) + \frac{N}{N+1} \times R_{A(design)} \times (1+x)\right] =$$

$$I_{in} \times (1+x) \times \left(R_{poly(design)} + \frac{N}{N+1} \times R_{A(design)}\right)$$

If $I_b$ is input as $I_{in}$, the output voltage is a constant value since $I_b = K*V_{bg}/[R_{poly}]$.

If $I_{bx}$ is input as $I_{in}$, the output voltage is positively proportional to (1+x), since $I_{bx}=K*V_{bg}/R_{ext}$. Therefore, the output voltage includes $R_{poly}$ drift information when $I_b$ and $I_{bx}$ are respectively input.

Figure 7:
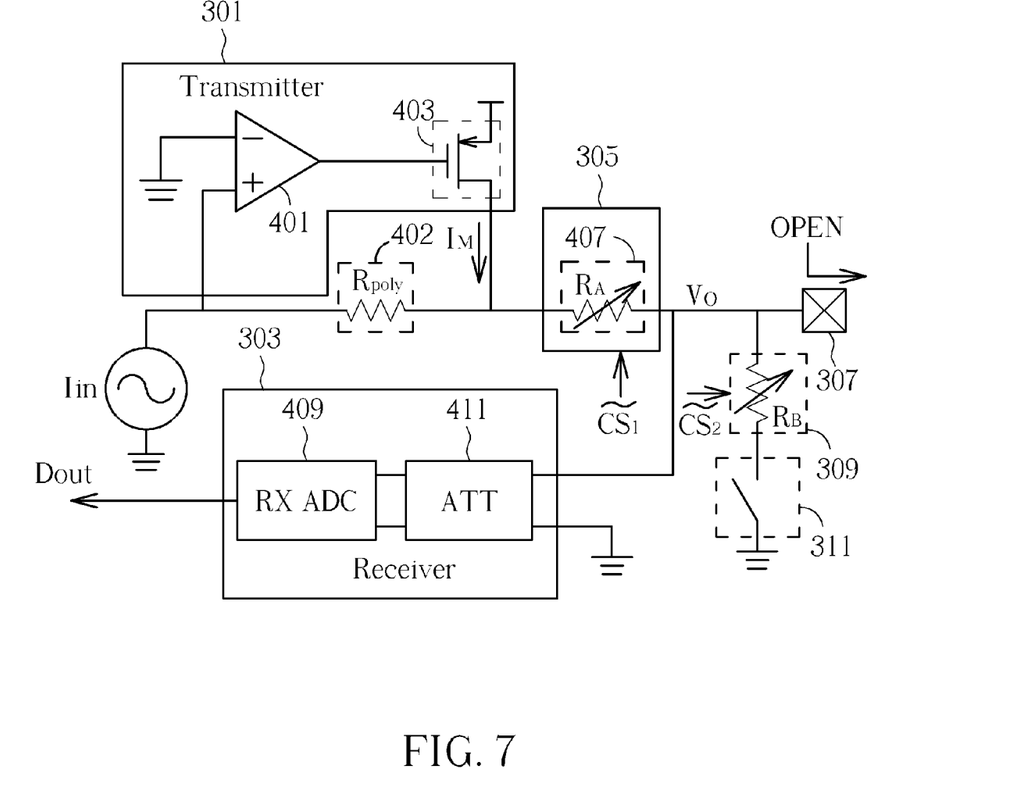
FIG. 7 is one example for a detail structure for the transceiving circuit shown in FIG. 4.
Figure 8:
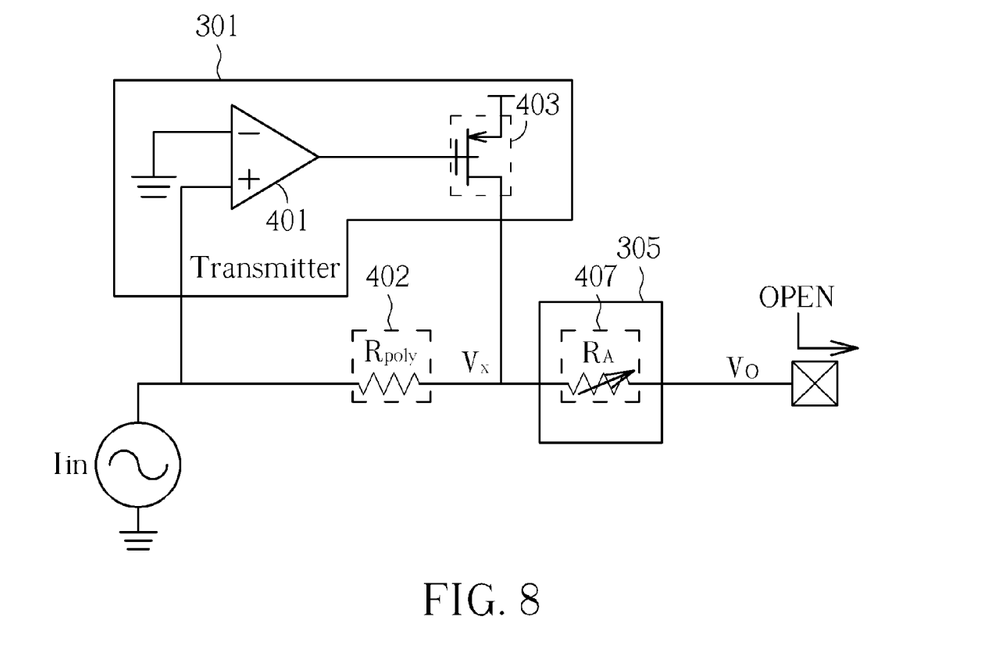
FIG. 8 depicts a situation that the transceiving circuit in FIG. 7 is open.

Besides the circuit shown in FIG. 5, the transceiving circuit can be as shown in FIG. 7, which has the variable resistance module 305 having only one transistor 403 but no transistor 405. FIG. 8 depicts a situation that the transceiving circuit in FIG. 7 is open.

The output voltage in FIG. 8 can be shown as follows:

$$V_{out}=V_x=I_{in} \times R_{poly}$$

If the drift for $R_{poly}$ process is "x", then $$V_{out}=I_{in} \times R_{poly(design)} \times (1+x)$$

Based on the description for FIG. 6, since $I_b=K*V_{bg}/[R_{poly}*(1+x)]$, the output voltage is a constant value if the current $I_b$ is input to $I_{in}$.

If $I_{bx}$ is input as $I_{in}$, the output voltage is positively proportional to (1+x), since $I_{bx}=K*V_{bg}/R_{ext}$.

However, in FIG. 7 and FIG. 8, the steps for computing $R_B$ drift information can be shown as following equations:

The relations between the output voltage $V_o$ and $R_B$ drift "y" is derived as follows, when the current input to the transmitter is twice the Ib, $R_{poly}$ resistor includes drift "x"→$R_{poly(real)}=R_{poly(design)}*(1+x)$ $R_A$ has already been calibrated, thus has no drift and $R_A=R_L$.

$R_B$ resistor has drift "y"→$R_{B(real)}=R_{B(design)}*(1+y)=R_L*(1+y)$.

$$V_{out} = I_{in} \times R_{poly(real)} \times \frac{R_{B(real)}}{R_{A(design)} + R_{B(real)}}$$

$$= I_{in} \times R_{poly(real)} \times (1+x) \times \frac{R_L \times (1+y)}{R_L + R_L \times (1+y)}$$

$$= \left(K_1 \times V_{bg} \times \frac{2}{1+x}\right) \times R_{poly(real)} \times (1+x) \times \frac{R_L \times (1+y)}{R_L + R_L \times (1+y)}$$

$$= 2 \times K_1 \times V_{bg} \times R_{poly(real)} \times \frac{(1+y)}{1+(1+y)}$$

Accordingly, the output voltage $V_{out}$ has information for $R_B$ drift "y".

Figure 9:
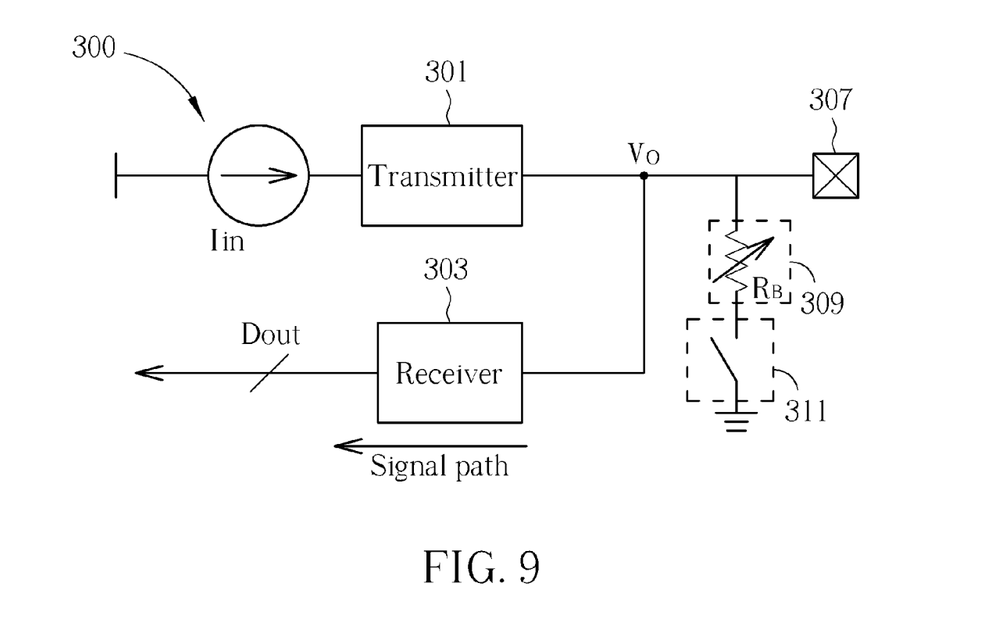
FIG. 9 is a block diagram illustrating a transceiving circuit according to another embodiment of the present invention.

FIG. 9 is a block diagram illustrating a transceiving circuit according to another embodiment of the present invention. Comparing with the embodiment shown in FIG. 4, FIG. 9 only includes the variable resistance module 309 but no variable resistance module 305. Also, the resistance calibration method corresponding to FIG. 9 is shown in FIG. 10. Since the detail description for FIG. 10 has been illustrated as above, thus it is omitted for brevity here.

In view of above-mentioned embodiment, the inner resistance of a transceiving circuit can be utilized to match desired resistance matching, thus the circuit area that is needed for prior art resistance matching mechanism can be saved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transceiving circuit resistance calibration method, applied to a transceiving circuit within a chip, the transceiving circuit including a first variable resistance module, a transmitter and a receiver, comprising:
    inputting a first current to the transmitter to generate a first output voltage, wherein the first current is generated according to a ratio between a predetermined voltage and an inner resistor of the chip;
    inputting a second current to the transmitter to generate a second output voltage, wherein the second current is generated according to a ratio between the predetermined voltage and a predetermined resistor; and
    adjusting the first variable resistance module according to the first output voltage and the second output voltage.

2. The transceiving circuit resistance calibration method of claim 1, wherein material of the first variable resistance module is the same as which of the inner resistor.

3. The transceiving circuit resistance calibration method of claim 1, wherein the transceiving circuit further comprises a second variable resistance module having a terminal coupled to the transmitter and the receiver, where the transceiving circuit resistance calibration method comprises:
    inputting a third current to the transmitter to generate a third output voltage, wherein the third current is generated according to a ratio between the predetermined voltage and the inner resistor;
    inputting a fourth current to the transmitter to generate a fourth output voltage; and
    adjusting the second variable resistance module according to the third output voltage and the fourth output voltage.

4. The transceiving circuit resistance calibration method of claim 3, where a value of the fourth current equals to a value of the third current plus a value of a fifth current, wherein the fifth current is generated according to a ratio between the predetermined voltage and the predetermined resistor.

5. The transceiving circuit resistance calibration method of claim 3, comprising:
    controlling the second variable resistance module and the receiver not to generate a conductive path, when the transmitter is transmitting a signal; and
    turning off the transmitter and controlling the second variable resistance module and the receiver to generate a conductive path, when the transmitter is not transmitting a signal.

6. A transceiving circuit resistance calibration method, applied to a transceiving circuit within a chip, the transceiving circuit including a first variable resistance module, a transmitter and a receiver, wherein the variable resistance module has a first terminal coupled to the transmitter and the receiver, and has a second terminal coupled to a ground level, the transceiving circuit resistance calibration method comprising:
    inputting a first current to the transmitter to generate a first output voltage, wherein the first current is generated according to a ratio between a predetermined voltage and an inner resistor of the chip;
    inputting a second current to the transmitter to generate a second output voltage, wherein the second current corresponds to the first current; and
    adjusting the variable resistance module according to the first output voltage and the second output voltage.

7. The transceiving circuit resistance calibration method of claim 6, where a value of the second current equals to a value of the first current plus a value of a third current, wherein the third current is generated according to a ratio between the predetermined voltage and a predetermined resistor.

8. A transceiving circuit within in a chip, comprising:
    a transmitter;
    a receiver;
    a first variable resistance module, coupled to the transmitter and the receiver; and
    a control unit, for controlling a first current to be transmitted to the transmitter to generate a first output voltage, wherein the first current is generated according to a ratio between a predetermined voltage and an inner resistor of the chip, wherein the control unit also controls a second current to be transmitted to the transmitter to generate a second output voltage, wherein the second current is generated according to a ratio between the predetermined voltage and a predetermined resistor, where the control unit further adjusts the first variable resistance module according a difference between the first output voltage and the second output voltage.

9. The transceiving circuit of claim 8, wherein material of the first variable resistance module is the same as which of the inner resistor.

10. The transceiving circuit of claim 8, wherein the transmitter comprises:
    a first transistor, having a source terminal coupled to a first terminal of the first variable resistance module.

11. The transceiving circuit of claim 10, wherein the transmitter comprises:
    a second transistor, having a drain terminal coupled to a second terminal of the first variable resistance module.

12. The transceiving circuit of claim 8, wherein the transceiving circuit further comprises a second variable resistance module having a terminal coupled to the transmitter and the receiver, where the control unit controls a third current to be transmitted to the transmitter to generate a third output voltage, wherein the third current is generated according to a ratio between the predetermined voltage and the inner resistor, where the control unit controls a fourth current to be transmitted the transmitter to generate a fourth output voltage; wherein the control unit further adjusts the second variable resistance module according to the third output voltage and the fourth output voltage.

13. The transceiving circuit of claim 12, where a value of the fourth current equals to a value of the third current plus a value of a fifth current, wherein the fifth current is generated according to a ratio between the predetermined voltage and the predetermined resistor.

14. The transceiving circuit of claim 12, wherein the control unit controls the second variable resistance module and the receiver not to generate a conductive path when the transmitter is transmitting a signal, where the control unit turns off the transmitter and controls the second variable resistance module and the receiver to generate a conductive path when the transmitter is not transmitting a signal.

15. A transceiving circuit within a chip, comprising:
a transmitter;
a receiver;
a variable resistance module, coupled to the transmitter and the receiver; and
a control unit, for controlling a first current transmitted to the receiver to generate a first output voltage, wherein the first current is generated according to a ratio between a predetermined voltage and an inner resistor of the chip, where the control unit controls a second current transmitted to the receiver to generate a second output voltage, wherein the second current corresponds to the first current; where the control unit further adjusts the variable resistance module according to a difference between the first output voltage and the second output voltage.

16. The transceiving circuit of claim 15, wherein a value of the second current equals to a value of the first current plus a value of a third current, where the third current is generated according to a ratio between the predetermined voltage and a predetermined resistor.

17. The transceiving circuit of claim 15, wherein the control unit controls the variable resistance module and the receiver not to generate a conductive path when the transmitter is transmitting a signal, where the control unit turns off the transmitter and controls the second variable resistance module and the receiver to generate a conductive path when the transmitter is not transmitting a signal.

* * * * *